J. Stark.
Dough Raiser.
Nº 90,471. Patented May 25, 1869.
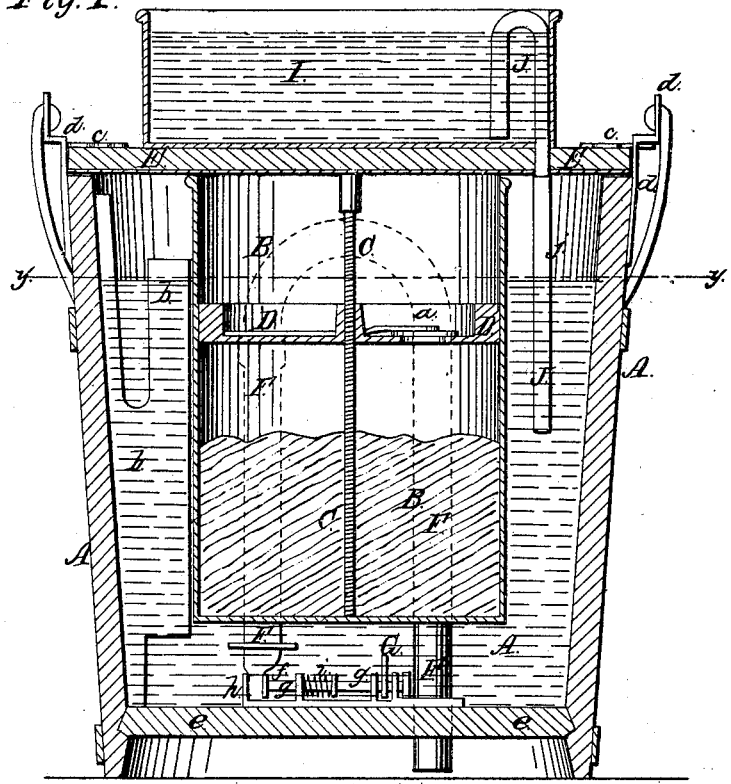
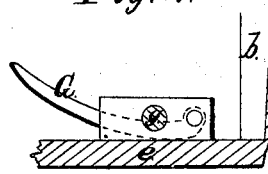
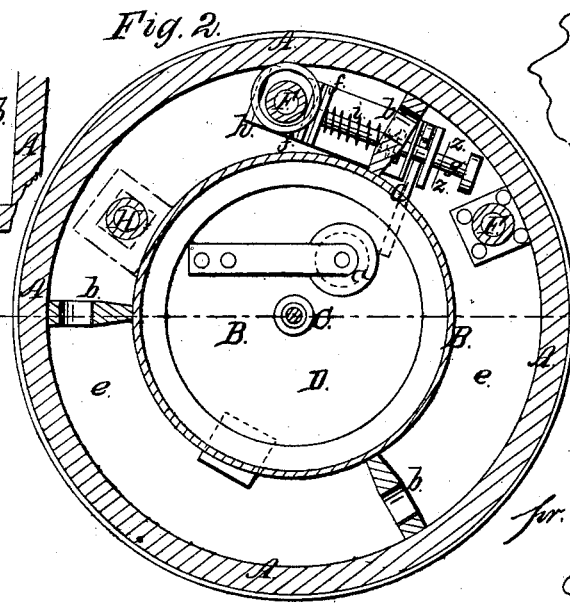
Witnesses.
Wm A Morgan
P. C. Dietrich
Inventor.
J. Stark
per Munn &
Attorneys

United States Patent Office.

JOHN STARK, OF THOMASVILLE, GEORGIA.

Letters Patent No. 90,471, dated May 25, 1869.

---

IMPROVED AUTOMATIC DOUGH-RAISER.

---

The Schedule referred to in these Letters Patent and making part of the same.

---

*To all whom it may concern:*

Be it known that I, JOHN STARK, of Thomasville, in the county of Thomas, and State of Georgia, have invented a new and improved Automatic Dough-Raiser; and I do hereby declare that the following is a full, clear, and exact description thereof, which will enable others skilled in the art to make and use the same, reference being had to the accompanying drawings, forming part of this specification, in which—

Figure 1 represents a sectional elevation of my improved automatic dough-raiser, taken on the plane of the line $x\ x$, fig. 2.

Figure 2 is a horizontal section of the same, taken on the plane of the line $y\ y$, fig. 1.

Figure 3 is a detail plan view of the same.

Figure 4 is a detail vertical section of the same, taken on the plane of the line $z\ z$, fig. 2.

Similar letters of reference indicate like parts.

The object of this invention is to produce an apparatus in which dough can be caused to rise to the requisite height, without requiring to be guarded by an attendant, and without any danger of its rising higher than desired.

This apparatus will be very useful, not only to bakers, but also, and chiefly, to households, as the dough can be put in in the evening, and can rise during the night, so as to be ready for the oven the next morning.

The invention consists principally in so constructing the apparatus that the hot water, which surrounds the vessel containing the dough, will be automatically discharged as soon as the dough has risen to the requisite height.

The invention also consists in providing a means whereby cold water will be introduced, in place of the hot, as soon as the latter is discharged.

The invention also consists in the construction and arrangement of the device, by means of which the pipe through which the water is discharged is held closed and automatically opened.

The invention, finally, consists in arranging within the dough-receptacle an up-and-down adjustable cover, by means of which the height to which the dough should rise can be regulated.

A, in the drawing, represents a pail, or tub, made of wood or other suitable material, of suitable size and shape.

B is a cylindrical can, or vessel, made of sheet-metal or other suitable material, of such size that it can be readily inserted in the pail, it being shorter and smaller than the same.

In the vessel B is arranged an up-and-down adjustable cover, D, which is perforated to receive a screw, C, as shown. The screw is as long as the can, and stands on the bottom of the same, and supports the cover D at any desired height. By turning it, the cover can be raised or lowered to any height, and will be retained at such height.

A valve, $a$, is arranged in the cover, to allow the discharge of dough into the vacant space above the cover.

If, from any cause, the dough should rise more than was expected, the can would rest on the bottom of the bucket, and the screw-head against the bucket-top. The confined condition of the dough would develop a destructive power to the apparatus, which is avoided by the safety-valve $a$, allowing a discharge of dough into the vacant space above.

The dough is put into the can B, then the cover is adjusted, by turning the screw D to that height to which it is desired the dough should rise. The pail is then partly filled with hot water, and the can inserted, so that it will float in the pail, as shown.

In the pail are arranged ribs, $b\ b$, which keep the can in an upright position, and prevent it from tipping.

The water holds the can against the cover E of the pail, which cover is held securely down on the pail by means of hooks $c\ c$, that fit under and around the pail-ears, $d\ d$, as shown more particularly in figs. 1 and 3.

The dough in the can will gradually commence to rise, accelerated in this process by the heat of the surrounding water. When it has reached the cover D, it will press against the same, but it cannot force it upward, as the head of the screw C fits against the cover E. The pressure of the expanding dough will therefore force the can downward toward the bottom, $e$, of the pail.

F is a siphon, arranged within the pail, so that its long arm fits through the bottom, while its short arm reaches nearly to the said bottom.

The end of the short arm is made of rubber or other suitable flexible material. This flexible end of the pipe can be compressed between a sliding head, $f$, of a rod, $g$, and a stationary lug, $h$.

The lug projects upward from the bottom $e$, while the pin, or rod $g$, works through two or more such lugs, and has a spring, $i$, that tends to draw its head away from the lug $h$.

When the pipe is to be closed, the head is pushed toward the lug $h$, and the pin is then locked in this position, by means of a lever, G. This lever is pivoted at one end to the bottom $e$, or to some lug projecting therefrom, and is fitted, from underneath or (if it is a lever of the first class) from above, into a notch cut into the rod $g$, as shown in fig. 4.

When, by the aforesaid means, the can is forced downward, it will at last come in contact with the lever G, and will, by moving the same downward, cause the release of the rod $g$, which will be violently thrown back by the spring $i$, so as to suddenly release the end of the siphon. This sudden opening of the siphon will set the same in operation, and the hot water will thereby be discharged from the pail.

Instead of the siphon, a simple pipe, H, may project from below into the bottom $e$, adn may have its upper end closed by the devices *f, g, h, i*, and G, as aforesaid. The water would then simply run out through such pipe, which is indicated at H, in fig. 2.

Thus, as soon as the dough in the can has reached the desired height, the hot water will be discharged from the pail, to prevent further fermentation of the dough.

Upon the cover E may be placed a vessel, I, to contain cold water.

A siphon, J, much smaller than F, or with its lower end and that part which is in the vessel I contracted, is arranged in this vessel, and reaches, with its long arm *j*, into the pail, and into the hot water.

When the hot water is being discharged from the pail, a vacuum is being produced in the pipe *j*, thereby setting the siphon J in operation, and introducing cold in the place of hot water into the pail, to still more effectually stop fermentation in the can.

The pipe J must be of much smaller diameter than F, or so arranged, as aforesaid, that the hot water will run out quicker than the cold water comes in, to prevent the siphon F from drawing out the cold water, the supply of cold water coming in too slow to start anew the siphon F.

The under side of the cover E may be lined with zinc or other non-conducting material, to prevent the said cover from shrinking, and to prevent the water in the pan I from becoming warm.

Instead of being adjustable by means of the screw C, the cover D may fit loosely around an upright rod, and may be fastened to it by means of a set-screw or other equivalent means.

Having thus described my invention,

I claim as new, and desire to secure by Letters Patent—

1. The can B, when provided with an adjustable cover, D, which can be moved up and down by means of or on a screw or rod, C, substantially as herein shown and described.

2. The lug *h* and the rod *g*, having the head *f*, and the spring *i*, for closing the end of the pipe F or H, when arranged in combination with the lever G, for opening the said pipe, as set forth.

3. The automatic dough-raiser, consisting of the pail A, can B, cover D, and screw or rod C, in combination with the cover E, pipe F or H, sliding pipe-compresser *g*, and lever G, all made and operating substantially as herein shown and described.

4. The device set forth in the foregoing clause, in combination with the vessel I and siphon J, arranged and operating as set forth.

JOHN STARK.

Witnesses:
FRANK BLOCKLEY,
ALEX. F. ROBERTS.